United States Patent [19]

Mühlbach

[11] Patent Number: 5,358,382

[45] Date of Patent: Oct. 25, 1994

[54] FAN AND FAN DRIVE ASSEMBLY

[75] Inventor: Günther Mühlbach, Meersburg, Fed. Rep. of Germany

[73] Assignee: Eaton Corporation, Cleveland, Ohio

[21] Appl. No.: 95,637

[22] Filed: Jul. 21, 1993

[51] Int. Cl.⁵ .............................................. F04D 29/00
[52] U.S. Cl. .............................. 416/169 A; 416/229 R; 416/204 R
[58] Field of Search .......... 416/169 A, 204 R, 241 A, 416/244 R, 229 R; 264/273, 328.1

[56] References Cited

U.S. PATENT DOCUMENTS

| 2,381,567 | 8/1945 | Bonham | 230/271 |
|---|---|---|---|
| 3,494,539 | 2/1970 | Littleford | 416/241 A |
| 3,642,382 | 2/1972 | Hayashi | 416/169 |
| 3,659,471 | 5/1972 | Marsch | 74/230 |
| 3,751,181 | 8/1973 | Hayashi | 416/229 |
| 3,993,415 | 11/1976 | Hauser | 416/93 |
| 4,370,074 | 1/1983 | Masai | 403/388 |
| 4,850,465 | 7/1989 | Ono | 192/58 |
| 4,974,712 | 12/1990 | Brown | 192/58 B |
| 5,076,760 | 12/1991 | Weefman et al. | 416/204 R |
| 5,178,517 | 1/1993 | Reinhorn et al. | 416/241 A |

FOREIGN PATENT DOCUMENTS

| 1115585 | 10/1961 | Fed. Rep. of Germany | ... 416/241 A |
|---|---|---|---|
| 2361481 | 6/1974 | Fed. Rep. of Germany | ...... 416/229 |
| 1418236 | 12/1975 | United Kingdom | ........... 416/169 A |

Primary Examiner—Edward K. Look
Assistant Examiner—Mark Sgantzos
Attorney, Agent, or Firm—L. J. Kasper

[57] ABSTRACT

A fan and fan drive assembly (11) is disclosed of the type including a fan drive (13) and a fan assembly (15). The fan drive (13) includes a body member (21) and a cover member (23), one of the members comprising a die-cast member and including a connecting portion (65; 165; 201) having a terminal portion (67, 69; 102; 267, 269). The fan (15) comprises a one-piece molded plastic member, and during the molding step, whichever of the body and cover defines the connecting portion is disposed within the molding die (M). The terminal portion of the connecting portion is disposed within a hub cavity (H), so that, when the moldable plastic material is injected into the hub cavity, it forms the fan hub (61) about, and rigidly connected to the terminal portion of the connecting portion. As a result, there is no need to bolt a fan assembly to the fan drive, thus eliminating the tapping of internally threaded holes in the body or cover of the fan drive, and eliminating the expense of bolts and the assembly time for bolting the fan to the fan drive.

11 Claims, 5 Drawing Sheets

FAN AND FAN DRIVE ASSEMBLY

BACKGROUND OF THE DISCLOSURE

The present invention relates to an assembly of a fluid coupling device and a fan, and more particularly, to an improved arrangement for attaching a fan to a fluid coupling device, as well as an improved method for such attachment.

It will become apparent to those skilled in the art from the subsequent description that the mounting arrangement of the present invention may be utilized advantageously with various types of fans, as well as with various types of fluid coupling devices. However, the invention is especially useful for attaching a radiator cooling fan for cooling a vehicle engine to a viscous fan drive, and the invention will be described in connection therewith. The invention is also especially useful when the fan is of the type having a hub portion and fan blades molded integrally therewith from a plastic material. Furthermore, the invention is especially useful when the fluid coupling device is of the type in which either the body member or the cover member comprises a die-cast member, and preferably, a die-cast aluminum member.

The fluid coupling device (viscous fan drive) is now well known to those skilled in the art, an example of which is shown in U.S. Pat. No. 4,974,712, assigned to the assignee of the present invention and incorporated herein by reference. Conventionally, the fluid coupling device is manufactured separate from the fan assembly, and they are brought together for the first time at, for example, the engine assembly plant.

The typical fan assembly of the type used with a viscous fan drive comprises a stamped, sheet metal connecting member, with the fan being formed by injection molding, wherein the hub of the fan is molded around a portion of the sheet metal connecting member. Subsequently, the fan assembly is bolted to the fan drive, by means of a series of bolts. Therefore, either the cast body or the cast cover of the fan drive must include a series of tapped, internally-threaded holes to facilitate bolting of the fan assembly to the fan drive.

As a result of the conventional fan and fan drive arrangement and assembly method, there is substantial expense incurred for the extra machining (tapped holes) of either the body or the cover, as well as the cost of the bolts, and the labor cost associated with bolting the fan to the fan drive. Furthermore, the process of tapping the bolt holes in the body or in the cover has the potential of causing damage to the body or cover, resulting in a higher scrap rate than would otherwise occur, which is an additional, unnecessary expense.

SUMMARY OF THE INVENTION

Accordingly, it is an object of the present invention to provide a fan and fan drive assembly, and assembly method, which eliminates the cost of tapping bolt holes, eliminates the cost of the bolts, and eliminates the labor cost associated with bolting the fan to the fan drive.

The above and other objects of the present invention are accomplished by a fan and fan drive assembly for use in cooling an engine, the assembly including a fan comprising an annular hub and a plurality of fan blades formed integrally with the hub, the fan being formed of a moldable plastic material. The assembly further includes a fan drive comprising an input member, an output assembly, and means operable to transmit torque from the input member to the output assembly in response to rotation of the input member. The output assembly comprises a body member and a cover member, and one of the members comprises a cast member defining a nominal outside diameter.

The fan and fan drive assembly is characterized by whichever of the body member and the cover member comprises the cast member includes at least one integrally (monolithically) formed connecting portion extending radially outward beyond the nominal outside diameter, and terminating in a radially outward terminal portion. The annular hub of the fan is non-rotatably attached to the terminal portion of the connecting portion.

In accordance with a more limited aspect of the present invention, in one embodiment, the cover member comprises a cast aluminum member, and the connecting portion is cast integrally therewith. In another embodiment, the body member comprises a cast aluminum member, and the connecting member is cast integrally therewith.

In accordance with another aspect of the present invention, the non-rotatable attachment of the annular hub of the fan and the terminal portion of the connecting portion comprises the connecting portion being disposed within a die cavity during the molding of the annular hub of the fan.

DESCRIPTION OF THE PREFERRED EMBODIMENTS

Figure 1:
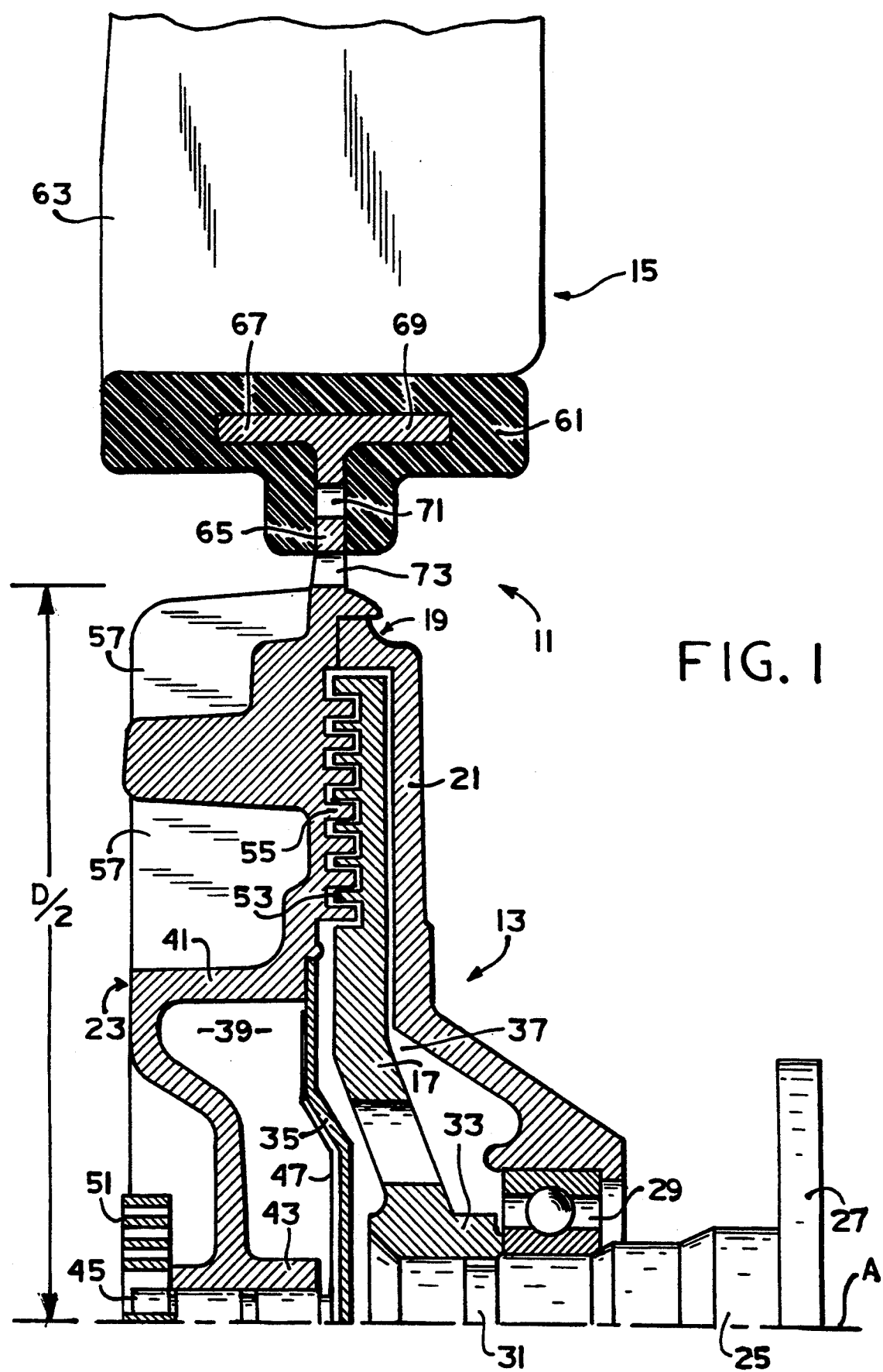
FIG. 1 is an axial cross-section of the upper half of a fan and fan drive assembly made in accordance with the present invention.

Referring now to the drawings, which are not intended to limit the invention, FIG. 1 illustrates one preferred form of a fan and fan drive assembly made in accordance with the present invention. The fan and fan drive assembly illustrated in FIG. 1, and generally designated I 1, includes a fan drive 13 (also referred to as a fluid coupling device or a viscous fan drive), and a fan 15. Typically, the fan 15 would be utilized as a radiator cooling fan, to cool the coolant fluid flowing through an internal combustion engine.

The fan drive 13 includes an input coupling member, generally designated 17, and an output coupling assembly, generally designated 19. The output coupling assembly 19 includes a die-cast aluminum body member 21, and a die-cast aluminum cover member 23, the members 21 and 23 being secured together by a rollover of the outer periphery of the cover member 23, as is well known in the art. It should be understood by those skilled in the art that the present invention is not limited to a fan drive in which either or both of the body and cover comprise aluminum die castings, although at least the body of most commercial fan drives comprises an aluminum die casting, and frequently the cover does, also.

The fan drive 13 further includes an input shaft 25 on which the input coupling member 17 is mounted. The input shaft 25 is rotatably driven, typically by means of a flange 27, which may be bolted to the mating flange of an engine water pump crankshaft or remote. The input shaft 25 functions as a support for the inner race of a bearing set 29, which is seated on the inside diameter of the body member 21. The forward end (left end in FIG. 1) of the input shaft 25 has an interference fit between a serrated portion 31 and an opening defined by a hub portion 33 of the input coupling member 17. As a result, rotation of the input shaft 25 causes rotation of the input coupling member 17.

The body member 21 and the cover member 23 cooperate to define a fluid chamber which is separated, by means of a circular valve plate 35, into a fluid operating chamber 37 and a fluid reservoir chamber 39. Thus it may be seen that the input coupling member 17 is disposed within the fluid operating chamber 37.

The cover member 23 defines a raised, annular reservoir-defining portion 41, which is disposed to be generally concentric about an axis of rotation A of the fan and fan drive assembly. The cover member 23 further defines a generally cylindrical shaft support portion 43, and rotatably disposed within the portion 43 is a valve shaft 45 extending outwardly (to the left in FIG. 1) through the cover member 23. Attached to the inner end (right end in FIG. 1) of the valve shaft 45 is a valve arm 47, which may be better understood by reference to U.S. Pat. No. 3,055,473, assigned to the assignee of the present invention and incorporated herein by reference. Preferably, the valve arm 47 may be made in accordance with the teachings of U.S. Pat. No. 4,974,712, also assigned to the assignee of the present invention and incorporated herein by reference. Movement of the valve arm 47 controls the flow of fluid from the reservoir chamber 39 to the operating chamber 37, through a fill opening (not shown herein) formed in the valve plate 35.

Operatively associated with the outer end of the valve shaft 45 is a temperature-responsive bimetal element, comprising a coil member 51, which includes an inner end portion in engagement with the valve shaft 45. The manner in which the bimetal coil 51 operates to control the movement of the valve arm 47, in response to variations in a predetermined ambient temperature condition, is well known in the art, is not an essential feature, and will not be described further herein.

In above-incorporated U.S. Pat. No. 4,974,712, but not shown in FIG. 1, the cover member defines an axial passage communicating with the operating chamber 37, and a generally radial passage communicating from the axial passage to the fluid reservoir chamber 39. Disposed adjacent the axial passage is a pump (wiper) element operable to engage the relatively rotating fluid in the operating chamber and generate a localized region of relatively higher fluid pressure. Thus, there is continually a small quantity of fluid pumped back into the reservoir chamber, from the operating chamber, in a manner well known to those skilled in the art.

In the subject embodiment of the invention, although not an essential feature of the invention, the input coupling member 17 includes a forward surface which defines a plurality of annular lands 53. The adjacent surface of the cover member 23 forms a plurality of annular lands 55, the lands 53 and 55 being interdigitated to define a serpentine-shaped shear space therebetween. It is believed that in view of the above-incorporated patents, those skilled in the art can fully understand the construction and operation of the fluid coupling device illustrated in FIG. 1, as well as the various flow paths for the viscous fluid contained therein. Briefly, when torque is transmitted from the vehicle engine by means of the input shaft 25 to the input coupling member 17, the result is a shearing of the viscous fluid contained in the shear space defined between the annular lands 53 and 55. This results in the generation of heat, which must be dissipated, and the cover member 23 includes a plurality of cooling fins 57 disposed on the forward surface of the cover member 23, and designed specifically for the dissipation of heat generated in the viscous shear chamber.

The fan 15 comprises an annular hub 61 and a plurality of fan blades 63, which preferably are formed integrally with the hub 61. Furthermore, in the subject embodiment, the entire fan 15, including the hub 61 and the fan blades 63, comprise a single, integrally molded plastic fan of the type which is now well known to those skilled in the art. In view of the widespread commercial use of such fans, it is believed to be well within the ability of those skilled in the art to select a particular moldable plastic material, select a particular fan design, and determine the appropriate die design and injection molding process for forming the fan 15. Those skilled in the art will appreciate that, except as noted hereinafter, the particular configuration, material, and molding process for the fan are not essential elements of the present invention.

Figure 2:
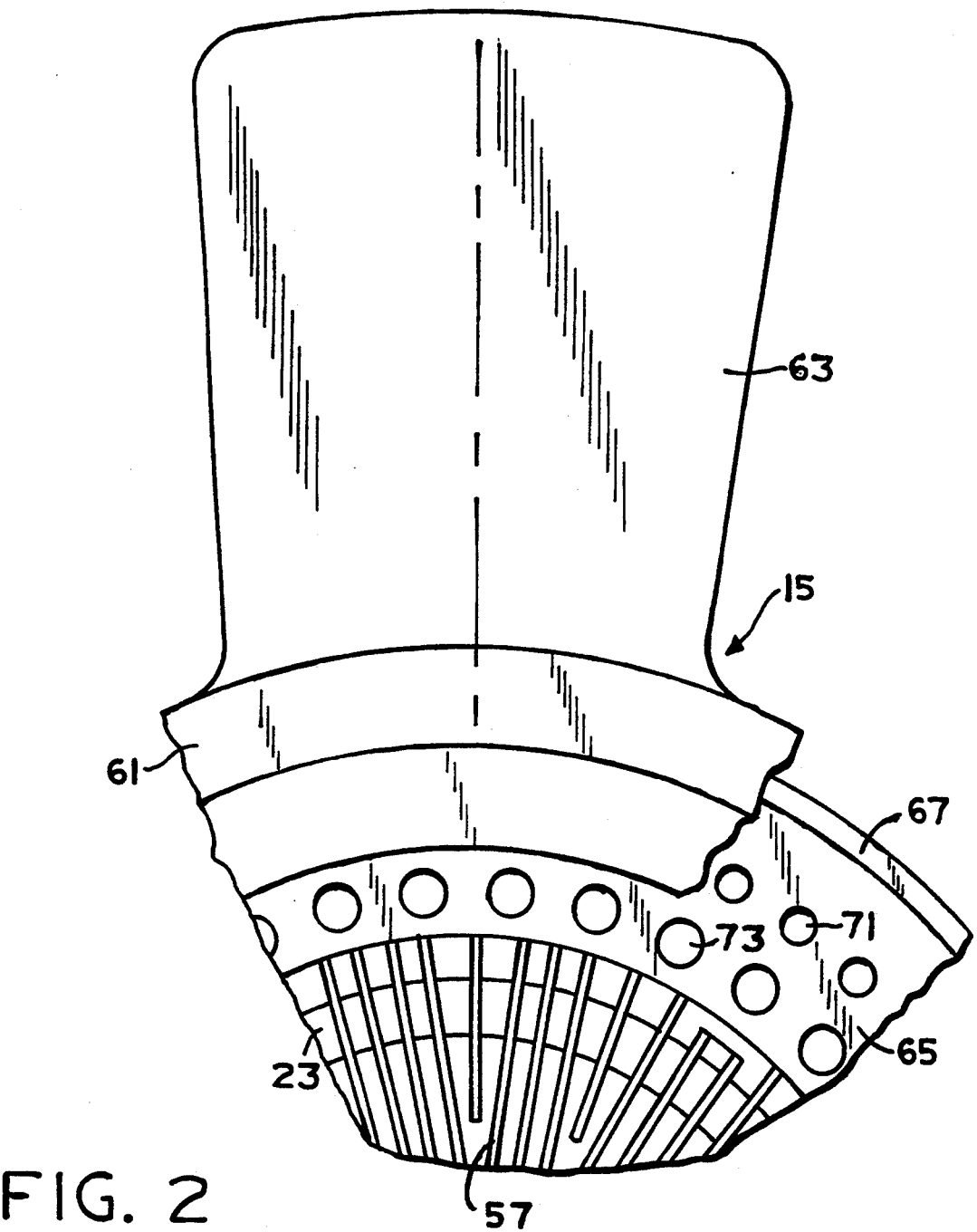
FIG. 2 is a fragmentary, front plan view of the fan and fan drive assembly of FIG. 1.

Referring now to FIG. 2, in conjunction with FIG. 1, the die-cast molding die M defines the annular, closed hub cavity H. Next, the molten plastic material is injected through the sprue opening S, filling the hub cavity H and all of the blade cavities B. As this molding step occurs, the molten plastic material fills each of the circular openings 71, but in such a way that the plastic material within the opening 71 is integral with the rest of the annular hub 61. Thus, for either direction of rotation of the cover 23, a portion of the surface (parallel to the axis of rotation A) of the openings 71 constitutes a drive surface. These drive surfaces assist in transmitting torque from the cover member 23 to the fan 15.

Figure 3:
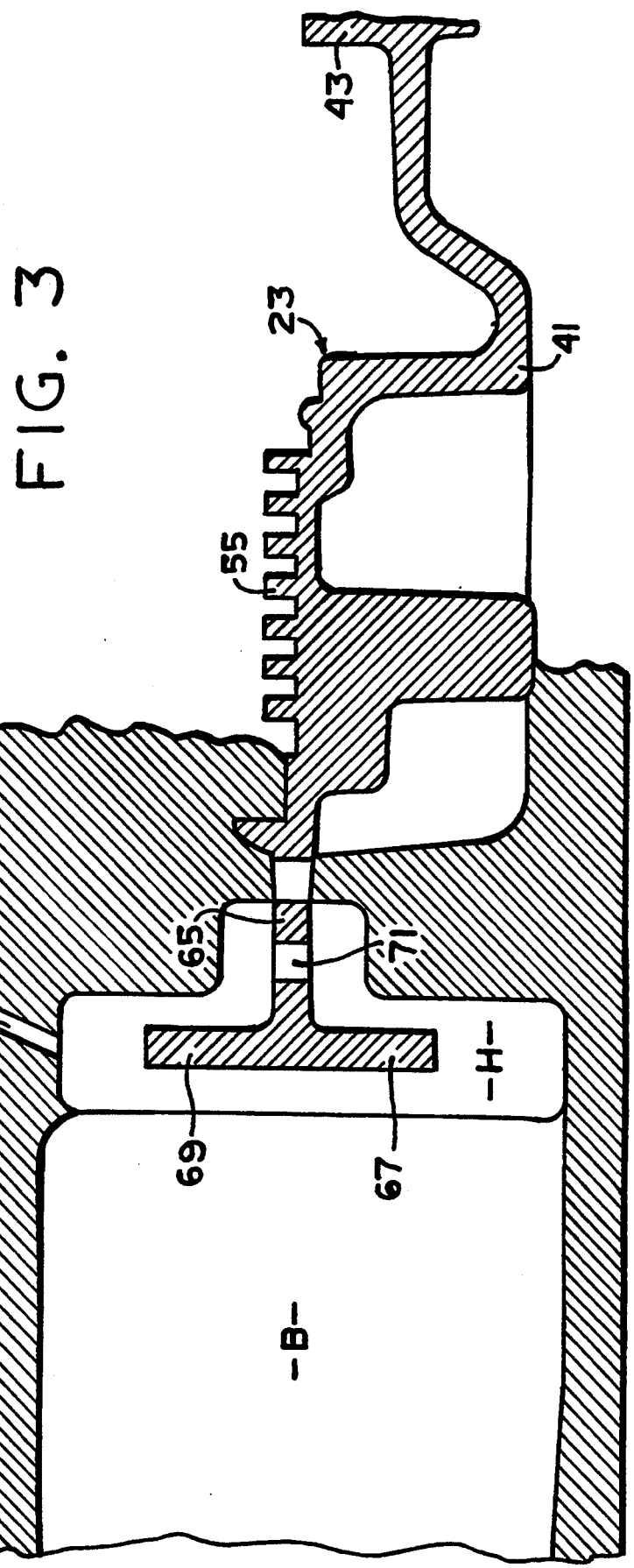
FIG. 3 is a somewhat schematic, fragmentary axial cross-section illustrating the method of assembly of the present invention.

It is believed that the configuration of the connecting portion 65, as shown in FIGS. 1 and 3, is beneficial in that the forwardly- and rearwardly-extending terminal portions 67 and 69 provide support for the annular hub 61, which is subject to substantial centrifugal force as the output coupling assembly 19 and the fan 15 rotate at speeds of anywhere from 300 to 10000 rpm, depending on engine speed.

As may be seen from FIGS. 1 through 3, molding the fan 15 about the terminal portions 67 and 69 of the connecting portion 65 results in an assembly of the fan and fan drive, which is essentially "free", from a manufacturing standpoint. The only additional cost associated with the molding of the fan 15 is the step of placing the cover member 23 within the molding die M. Subsequently, however, there is no need for tapping threaded holes in either the body member 21 or the cover member 23, the cost of threaded studs or bolts is eliminated, and there is no labor cost for bolting the fan 15 to the fan drive 13.

Figure 5:
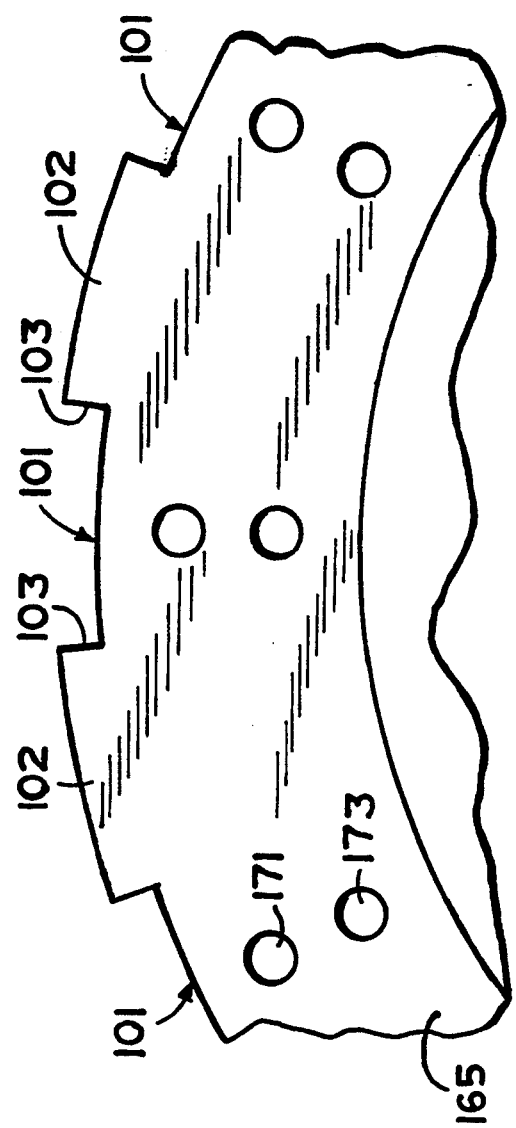
FIG. 5 is a fragmentary, front plan view of the body member shown in FIG. 4.
Figure 4:
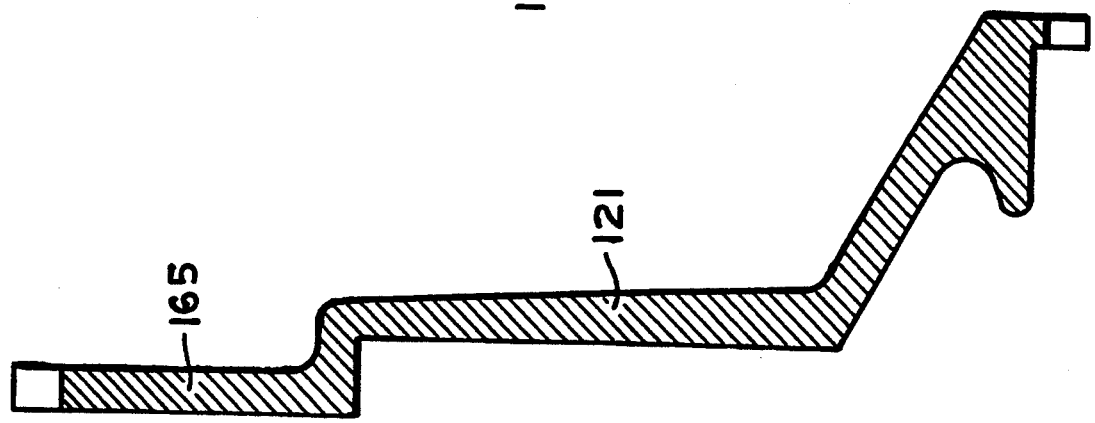
FIG. 4 is an axial cross-section of the upper half of the body member, illustrating an alternative embodiment of the invention.

Referring now to FIGS. 4 and 5, in conjunction with FIG. 1, there is illustrated in FIGS. 4 and 5 an alternative embodiment of the invention in which like elements bear like numerals, plus 100, and new elements bear numerals beginning with "101".

In the embodiment of FIGS. 4 and 5, the body member 121 includes, cast integrally (monolithically) therewith, a connecting portion 165. The connecting portion 165 is, in the same manner as the embodiment of FIGS. 1 and 2, a generally aluminum cover member 23 includes an annular, radially-extending connecting portion 65. As may best be seen in FIG. 1, the fan drive 13 defines a nominal outside diameter D (note the radial dimension designated "D/2"). Therefore, as used herein, the term "radially-extending" in regard to the connecting portion 65 will be understood to mean that the portion 65 extends radially beyond the nominal outside diameter D of the fan drive 13.

The connecting portion 65, in the subject embodiment, has a generally T-shaped cross-section, such that the connecting portion 65 includes a forwardly-extending terminal portion 67 and a rearwardly-extending terminal portion 69. The connecting portion 65 defines a plurality of circular openings 71, and a plurality of circular openings 73. The function of the openings 71 will be discussed further subsequently, but the openings 73 are included primarily to permit the passage of air axially through the connecting portion 65 (see arrows in FIG. 1 ). Such a flow of air facilitates heat dissipation from the fan drive 13.

Referring now primarily to FIG. 3, there is illustrated one aspect of the present invention, i.e., the method of assembly of the fan drive 13 and fan 15. In FIG. 3, there is schematically illustrated the step of injection molding the fan 15, but with FIG. 3 illustrating a point in time before the molding occurs, such that the plastic material which will comprise the fan 15 is not yet present in FIG. 3. There is shown in FIG. 3 a fragmentary, axial section through a molding die M, which defines a sprue S, through which the molten, moldable plastic material is injected. The molding die M defines an annular hub cavity H, which conforms to the shape of the annular hub 61 of the fan 15. The molding die M also defines a plurality of blade cavities B, each of which is open to the hub cavity H, and conforms to the shape of the fan blades 63.

Referring still to FIG. 3, the method of molding the fan 15 starts with the step of placing the die-cast aluminum cover member 23 between the upper and lower halves of the molding die M. As may be seen in FIG. 3, with the upper and lower die halves in place about the cover member 23, the annular, continuous portion. The connecting portion 165 defines circular openings 1 71 which are filled with molten plastic material during the molding process, in the same manner as described in connection with the primary embodiment. Similarly, the connecting portion 165 defines a plurality of circular openings 173, which facilitate a flow of cooling air, as described previously.

Adjacent the outer periphery of the connecting portion 165 is a plurality of notches 101, oriented such that each adjacent pair of notches 101 defines therebetween a projection or terminal portion 102, and each notch 101 includes a pair of radially-extending drive surfaces 103 which further assist in transmitting torque from the body member 1 21 to the fan 15.

Figure 7:
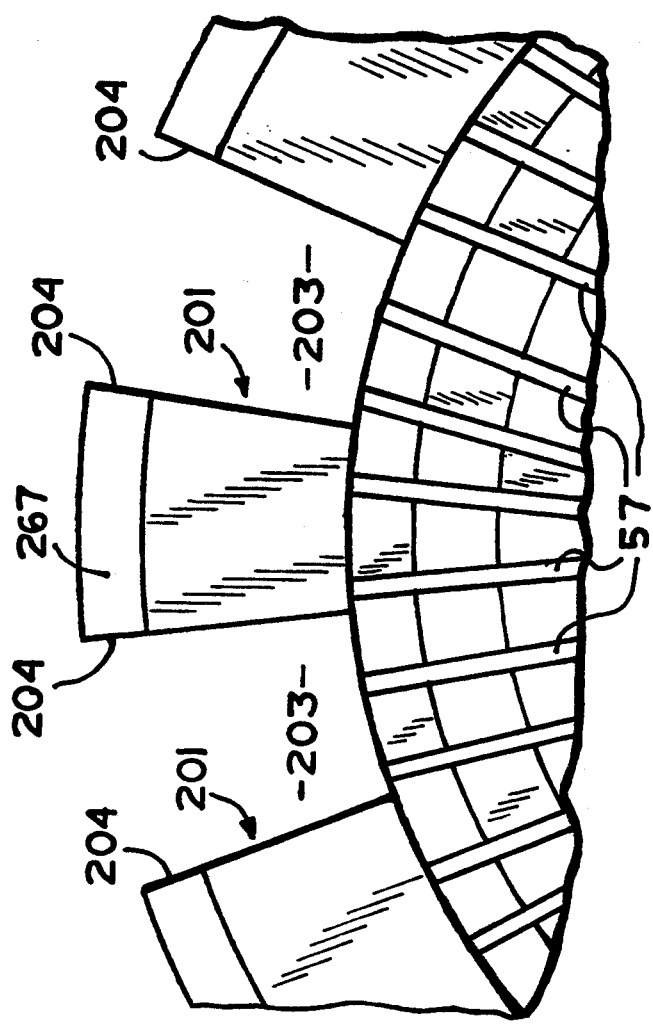
FIG. 7 is a fragmentary, front plan view of the cover member shown in FIG. 6.
Figure 6:
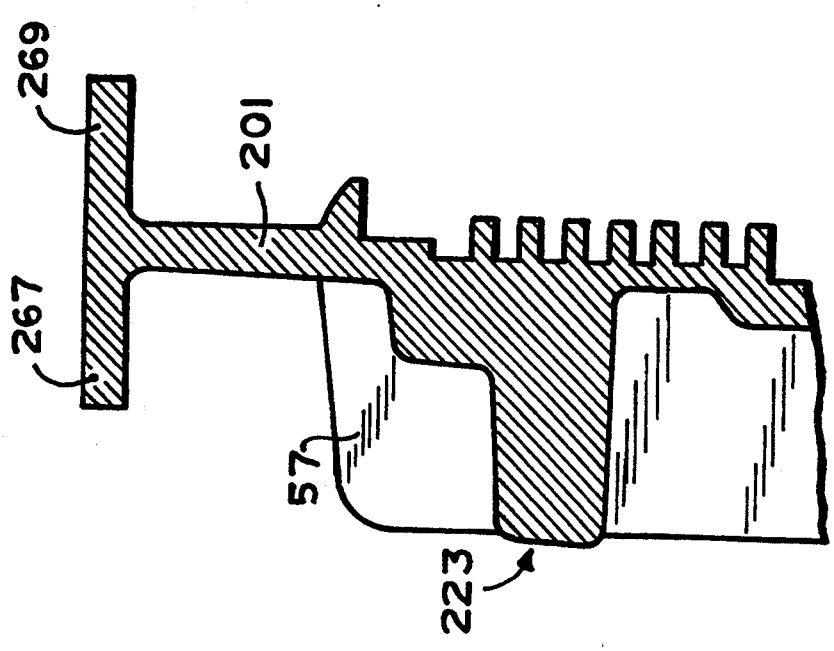
FIG. 6 is a fragmentary, axial cross-section of the upper half of a cover member illustrating another alternative embodiment of the invention.

Referring now primarily to FIGS. 6 and 7, in conjunction with FIG. 1, there is illustrated a further alternative embodiment in which the same or similar elements bear the same reference numeral, plus "200". New elements bear reference numerals beginning with "201". In FIG. 6, the die-cast aluminum cover member 223 has, formed integrally therewith, a plurality of separate, individual connecting portions 201, disposed such that a plurality of openings 203 are defined therebetween. Each of the connecting portions 201 includes a forwardly-extending terminal portion 267, and a rearwardly-extending portion 269, with the axial surfaces of the terminal portions 267 and 269 defining drive surfaces 204. The drive surfaces 204 function in much the same manner as the drive surfaces defined by the openings 71 or 171, and in the same manner as the drive surfaces 103.

From the embodiment shown in FIGS. 1 through 7, it may be seen that: (1) the connecting portion may be cast integrally with either the cover member or the body member; (2) the connecting portions may comprise either a single, annular portion, or a plurality of separate portions; and (3) the connecting portion may comprise merely a radially-extending portion, or may include either forwardly-extending or rearwardly-extending terminal portions, or both.

Furthermore, it should be appreciated by those skilled in the art that the various alternatives illustrated herein, and listed immediately above, may be combined in different combinations than those illustrated herein. However, for any particular configuration of connecting portion(s) and terminal portions, the fan 15 will typically have whatever its desired configuration is, independent of the configuration of the connecting portion (S).

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fan and fan drive assembly for use in cooling an engine, said assembly including a fan comprising an annular hub and a plurality of fan blades formed integrally with said hub, said fan being formed of a moldable plastic material; said assembly further including a fan drive comprising an input member, an output assembly, and means operable to transmit torque from said input member to said output assembly in response to rotation of said input member; said output assembly comprising a body member and a cover member, and one of said body member and said cover member comprising a cast member defining a nominal outside diameter; characterized by:

(a) said one of said body member and said cover member including at least one monolithically formed connecting portion extending radially outward beyond said nominal outside diameter and terminating in a radially outward terminal portion; and (b) said annular hub of said fan being non-rotatably attached to said terminal portion of said connecting portion.

2. A fan and fan drive assembly as claimed in claim 1, characterized by said cover member comprises a cast aluminum member and said connecting portion is cast integrally therewith.

3. A fan and fan drive assembly as claimed in claim 1, characterized by said body member comprises a cast aluminum member and said connecting portion is cast integrally.

4. A fan and fan drive assembly as claimed in claim 1, characterized by said non-rotatable attachment of said annular hub of said fan and said terminal portion comprising said connecting portion being disposed within a die cavity during the molding of said annular hub of said fan.

5. A fan and fan drive assembly as claimed in claim 4, characterized by one of said connecting portion and said terminal portion comprising a plurality of drive surfaces oriented generally parallel to an axis of rotation defined by said assembly, an integral portion of said moldable plastic material comprising said annular hub being disposed adjacent each of said drive surfaces, and in driven engagement therewith.

6. A fan and fan drive assembly as claimed in claim 5, characterized by said one of said connecting portions and said terminal portion defining a plurality of openings extending axially therethrough to define said plurality of drive surfaces.

7. A fan and fan drive assembly as claimed in claim 5, characterized by said terminal portion of said connecting portion defining a plurality of projections and a recess disposed circumferentially between each adjacent pair of projections, each of said projections defining one of said drive surfaces.

8. A fan and fan drive assembly as claimed in claim 4, characterized by said terminal portion comprising at least one axially-extending tab member, said tab member being disposed within an axially-extending portion of said annular hub.

9. A fan and fan drive assembly as claimed in claim 1, characterized by said one of said body member and said cover member including said connecting portion further defining a plurality of openings extending through said connecting portion, said openings being disposed radially between said fan drive and said annular hub of said fan.

10. A fan and fan drive assembly as claimed in claim 1, characterized by said non-rotatable attachment of said annular hub of said fan and said terminal portion comprising substantially the only connection between said fan drive and said fan.

11. A method of assembling a fan drive and a fan, said fan comprising an annular hub and a plurality of fan blades formed integrally with said hub, said fan being formed of a moldable plastic material; said fan drive comprising an input member, an output assembly, and means operable to transmit torque from said input member to said output assembly in response to rotation of said input member; said output assembly comprising a body member and a cover member, and one of said body member and said cover member comprising a cast member defining a nominal outside diameter; said method being characterized by:
 (a) providing said one of said body member and said cover member with at least one monolithically formed connecting portion extending radially outward beyond said nominal outside diameter and terminating in a radially outward terminal portion;
 (b) providing a molding die for molding said fan, said die including an annular hub cavity and a plurality of blade cavities in open communication with said hub cavity;
 (c) placing said one of said body member and said cover member in said molding die with said terminal portion of said connecting portion disposed within said hub cavity; and
 (d) injecting said moldable plastic material into said hub cavity and said blade cavities to form said hub about, and rigidly connected to, said terminal portion of said connecting portion.

* * * * *